US008219756B2

(12) United States Patent
Whalley et al.

(10) Patent No.: US 8,219,756 B2
(45) Date of Patent: Jul. 10, 2012

(54) SYSTEMS AND METHODS FOR LOOKAHEAD INSTRUCTION FETCHING FOR PROCESSORS UTILIZING TAGLESS HIT INSTRUCTION CACHES

(75) Inventors: David Benjamin Whalley, Tallahassee, FL (US); Gary Scott Tyson, Tallahassee, FL (US); Stephen Roderick Hines, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 454 days.

(21) Appl. No.: 12/274,379

(22) Filed: Nov. 20, 2008

(65) Prior Publication Data

US 2009/0132766 A1     May 21, 2009

Related U.S. Application Data

(60) Provisional application No. 60/989,354, filed on Nov. 20, 2007.

(51) Int. Cl.
*G06F 12/08*     (2006.01)
(52) U.S. Cl. .................. 711/122; 711/E12.02; 711/125
(58) Field of Classification Search .................. 711/123, 711/125
See application file for complete search history.

(56) References Cited

U.S. PATENT DOCUMENTS

| 6,185,675 B1* | 2/2001 | Kranich et al. | 712/238 |
| 7,685,411 B2* | 3/2010 | Ahmed et al. | 712/241 |
| 7,873,820 B2* | 1/2011 | Knoth | 712/241 |

OTHER PUBLICATIONS

Ann Gordon-Ross, Susan Cotterell and Frank Vahid. "Tiny Instruction Caches for Low Power Embedded Systems." Nov. 2003. ACM. ACM Transactions on Embedded Computing Systems. vol. 2.*
John L. Hennessy and David A. Patterson. Computer Architecture: A Quantitative Approach. 2003. Morgan Kaufmann. pp. 426-428.*
Dharmesh Parikh, Kevin Skadron, Yan Zhang, Marco Barcella, and Mircea R. Stan. Power Issues Related to Branch Prediction. Feb. 2002. IEEE. HPCA 2002.*
Eric Rotenberg, Steve Bennett, and James E. Smith. "Trace Cache: a Low Latency Approach to High Bandwidth Instruction Fetching." Dec. 1996. IEEE. MICRO 29.*
Lea Hwang Lee, Bill Moyer, and John Arends. "Instruction Fetch Energy Reduction Using Loop Caches for Embedded Applications with Small Tight Loops." 1999. IEEE. ISPLED 1999.*

(Continued)

*Primary Examiner* — Kevin Ellis
*Assistant Examiner* — Nathan N Sadler
(74) *Attorney, Agent, or Firm* — Sutherland Asbill & Brennan LLP

(57) ABSTRACT

Systems and methods may be provided for lookahead instruction fetching for processors. The systems and methods may include an L1 instruction cache, where the L1 instruction cache may include a plurality of lines of data, where each line of data may include one or more instructions. The systems and methods may also include a tagless hit instruction cache, where the tagless hit instruction cache may store a subset of the lines of data in the L1 instruction cache, where instructions in the lines of data stored in the tagless hit instruction cache may be stored with metadata indicative of whether a next instruction is guaranteed to reside in the tagless hit instruction cache, where an instruction fetcher may be arranged to have direct access to the L1 instruction cache and the tagless hit instruction cache, and where the tagless hit instruction cache may be arranged to have direct access to the L1 instruction cache.

18 Claims, 7 Drawing Sheets

OTHER PUBLICATIONS

Stephen Hines, David Whalley, and Gary Tyson. "Guaranteeing Hits to Improve the Efficiency of a Small Instruction Cache." Dec. 2007. ACM. MICRO 40.*

Tien-Fu Chen and Yi-Min Hwang. "Decoupling of data and tag arrays for on-chip caches." 2002. Elsevier Science. Microprocessors and Microsystems. vol. 25. pp. 437-447.*

Hong Wang, Tong Sun, and Qing Yang. "CAT—Caching Address Tags: A Technique for Reducing Area Cost of On-chip Caches." 1995. ACM. ISCA '95.*

John L. Hennessy and David A. Patterson. Computer Architecture: A Quantitative Approach. 2003. Morgan Kaufmann. pp. 398-399.*

N. Bellas et al., "Using dynamic cache management techniques to reduce energy in a high-performance processor," Proceedings of the 1999 International Symposium on Low Power Electronics and Design, San Diego, CA, United States, pp. 64-69, Aug. 1999.

K. Inoue et al., "Dynamic Tag-Check Omission: A Low Power Instruction Cache Architecture Exploiting Execution Footprints," In 2nd International Workshop on Power-Aware Computing Systems, pp. 67-72, Springer-Verlag, Feb. 2002.

A. MA et al., "Way Memoization to Reduce Fetch Energy in Instruction Caches," ISCA Workshop on Complexity Effective Design, Jul. 2001.

C.L. Yang et al., "Power Efficient Branch Prediction through Early Identification of Branch Addresses," In Proceedings of the International Conference on Compilers, Architecture, and Synthesis for Embedded Systems, pp. 169-178, Oct. 2006.

K. Inoue et al., "A History-Based I-Cache for Low-Energy Multimedia Applications," In Proceedings of the 202 International Symposium on Low Power Electronics and Design, pp. 148-153, New York, NY USA, ACM Press, Aug. 2002.

N.S. Kim et al., "Drowsy Instruction Caches: Leakage Power Reduction using Dynamic Voltage Scaling and Cache Sub-bank Prediction," In Proceedings of the 35th Annual ACM/IEEE International Symposium on Microarchitecture, Nov. 2002, pp. 219-230, Los Alamitos, CA, USA, IEEE Computer Society Press.

J. Kin et al., "The Filter Cache: An Energy Efficient Memory Structure," In Proceedings of the Dec. 1997 International Symposium on Microarchitecture, pp. 184-193, Dec. 1997.

W. Tang et al., "Design of a predictive filter cache for energy savings in high performance processor architectures," In Proceedings of the International Conference on Computer Design, pp. 68-73, Los Alamitos, CA, USA, IEEE Computer Society, Sep. 2001.

C.L. Yang et al., "HotSpot Cache: Joint Temporal and Spatial Locality Exploitation for I-Cache Energy Reduction," In Proceedings of the 2004 International Symposium on Low Power Electronics and Design, pp. 114-119, New York, NY, USA, ACM Press, Aug. 2004.

* cited by examiner

| Fetched | Result | Metadata Set |
|---|---|---|
| Inst 1 | miss | set line 0 NS bit |
| Inst 5 | miss | set inst 1 NT bit |
| Insts 6,7 | hits | |
| Inst 2 | false miss | set inst 7 NT bit |
| Insts 3, 4 | hits | |
| Inst 5 | false miss | set line 1 NS bit |
| Insts 6, 7 | hits | |
| Insts 2 | hit | |
| Insts 3,4 | hits | |
| Inst 5 | hit | |
| Insts 6,7 | hits | |
| Inst 8 | hit | |

SYSTEMS AND METHODS FOR LOOKAHEAD INSTRUCTION FETCHING FOR PROCESSORS UTILIZING TAGLESS HIT INSTRUCTION CACHES

RELATED APPLICATION

The present application claims priority to U.S. Provisional Application Ser. No. 60/989,354, filed Nov. 20, 2007, and entitled "Lookahead Instruction Fetch," which is hereby incorporated by reference in its entirety as if fully set forth herein.

FIELD OF THE INVENTION

Aspects of an embodiment of the invention relate generally to processors, and more particularly, to systems and methods for lookahead instruction fetching for processors.

BACKGROUND OF THE INVENTION

Embedded systems are often subject to tighter power constraints due to their portable nature and increased dependence on batteries. Previous studies have shown that the instruction cache can be responsible for a significant portion of the energy consumption. Although traditional caches are often found on embedded processors, some also include specialized cache structures to further reduce energy requirements. Such specialized cache structures include filter/L0 instruction caches. A filter/L0 instruction cache is typically placed in series before the L1 instruction cache. Since the filter/L0 instruction cache is accessed instead of the L1 instruction cache (L1-IC), any miss in the filter/L0 instruction cache incurs an additional I-cycle miss penalty prior to fetching the appropriate line from the L1-IC. Although a filter/L0 instruction cache reduces the requirements for fetch energy, these miss penalties can accumulate and result in significant performance degradation.

Accordingly, there is a need in the industry for lookahead instruction fetching for processors.

SUMMARY OF THE INVENTION

According to an example embodiment of the invention, there may be a system. The system may include an L1 instruction cache, where the L1 instruction cache may include a plurality of lines of data, where each line of data may include one or more instructions, and a tagless hit instruction cache, where the tagless hit instruction cache may store a subset of the lines of data in the L1 instruction cache, where instructions in the lines of data stored in the tagless hit instruction cache may be stored with metadata indicative of whether a next instruction is guaranteed to reside in the tagless hit instruction cache, where an instruction fetcher may be arranged to have direct access to the L1 instruction cache and the tagless hit instruction cache, and where the tagless hit instruction cache may be arranged to have direct access to the L1 instruction cache.

According to another example embodiment of the invention, there may be a method for instruction fetching for a computer processor. The method may include providing an L1 instruction cache, where the L1 instruction cache may include a plurality lines of data, where each line of data may include one or more instructions; providing a tagless hit instruction cache, where the tagless hit instruction cache may store a subset of the lines of data in the L1 instruction cache, where instructions in the lines of data stored in the instruction cache may be stored with metadata indicative of whether a next instruction is guaranteed to reside in the tagless hit instruction cache; configuring an instruction fetcher to have direct access to the L1 instruction cache and the tagless hit instruction cache; and configuring the tagless hit instruction cache to have direct access to the L1 instruction cache.

BRIEF DESCRIPTION OF THE DRAWINGS

Reference will now be made to the accompanying drawings, which are not necessarily drawn to scale, and wherein.

DETAILED DESCRIPTION

Example embodiments of invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Example embodiments of the invention may be directed towards systems and methods for lookahead instruction fetching. More specifically, the systems and methods described herein may provide for guaranteeing instruction fetch from smaller, specialized instruction caches in order to avoid penalties associated with accessing the small cache when the instruction is not resident in the cache. By avoiding such access penalties and avoiding the need to access a tag array to verify that the instruction is resident, energy consumption and/or power requirements may be minimized with little or no impact on application execution times, according to an example embodiment of the invention.

Figure 1:
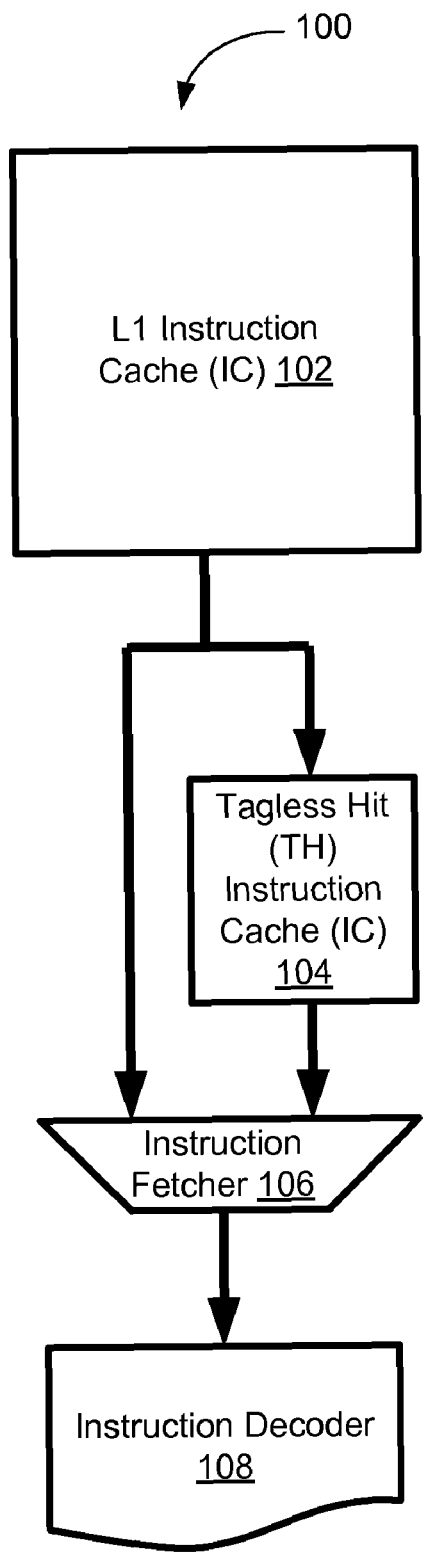
FIG. 1 illustrates an instruction fetch system in accordance with an example embodiment of the invention.

FIG. 1 illustrates an instruction fetch system 100 in accordance with an example embodiment of the invention. As shown in FIG. 1, the instruction fetch system 100 may include a L1 instruction cache (L1-IC) 102, a tagless hit instruction cache (TH-IC) 104, an instruction fetcher 106, and an instruction decoder 108. It will be appreciated that the instruction fetcher 106 may be arranged to have direct access to both the L1-IC 102 and the TH-IC 104. Accordingly, instructions may be fetched or accessed directly from either the L1-IC 102 or the TH-IC 104 by the instruction fetcher 106. In addition, it will also be appreciated that the TH-IC 104 may store instructions that are fetched or accessed from the L1-IC 102. Indeed, the TH-IC 104 may include a subset of the instructions stored in the L1-IC 102, according to an example embodiment of the invention.

According to an example embodiment of the invention, the L1-IC 102 may be a 16KB, 256 line, 16-byte line size, 4-way set associative L1-IC. The TH-IC 104 may be a smaller, specialized instruction cache compared to the L1-IC 102. For example, the TH-IC 104 may be a 128B, 8 line, 16-byte line size, direct-mapped instruction cache, according to an example embodiment of the invention. It should be appreciated that while certain examples of L1-IC 102 and TH-IC 104 have been described above, they are for illustrative purposes only and other embodiments of the invention may incorporate other L1-ICs and TH-ICs of varying sizes and parameters.

As will be described in further detail below, one or more instructions may be stored in the TH-IC 104 along with metadata bits (e.g., NT and NS bits, as described below) that may be used in determining when a requested instruction is guaranteed to reside in the TH-IC 104. According to an example embodiment of the invention, a requested instruction may be accessed in the TH-IC 104 only when the instruction is guaranteed to reside in the TH-IC 104, thereby avoiding any penalties (e.g., performance penalties) associated with an actual miss. Accordingly, if a requested instruction is not guaranteed to reside in the TH-IC 104, then the instruction may be retrieved directly from the L1-IC 102. The line data retrieved from the L1-IC 102 may then be stored in the TH-IC 104 along with metadata as will be described in further detail below. It will be appreciated that some opportunities may be missed to retrieve instructions from the TH-IC 104 when they might reside there but cannot be guaranteed; however, any reduction in hit rate may be offset by the ability to avoid any TH-IC 104 miss penalty, according to an example embodiment of the invention.

It will be appreciated that the instruction fetch system 100 illustrated in FIG. 1 is provided for example only, and that other variations of the system of FIG. 1 are available in accordance with other example embodiments of the invention. Indeed, a processor supporting multi-thread processing may utilize more than one TH-IC 104 with the L1-IC 102. For example, for a processor supporting 8 threads, there may likewise be 8 corresponding TH-ICs 104. Accordingly, the instruction fetcher 106 may have direct access to each of the 8 TH-ICs 104 as well as the L1-IC 102. Other variations of FIG. 1 will be known to those of ordinary skill in the art.

Figure 2:
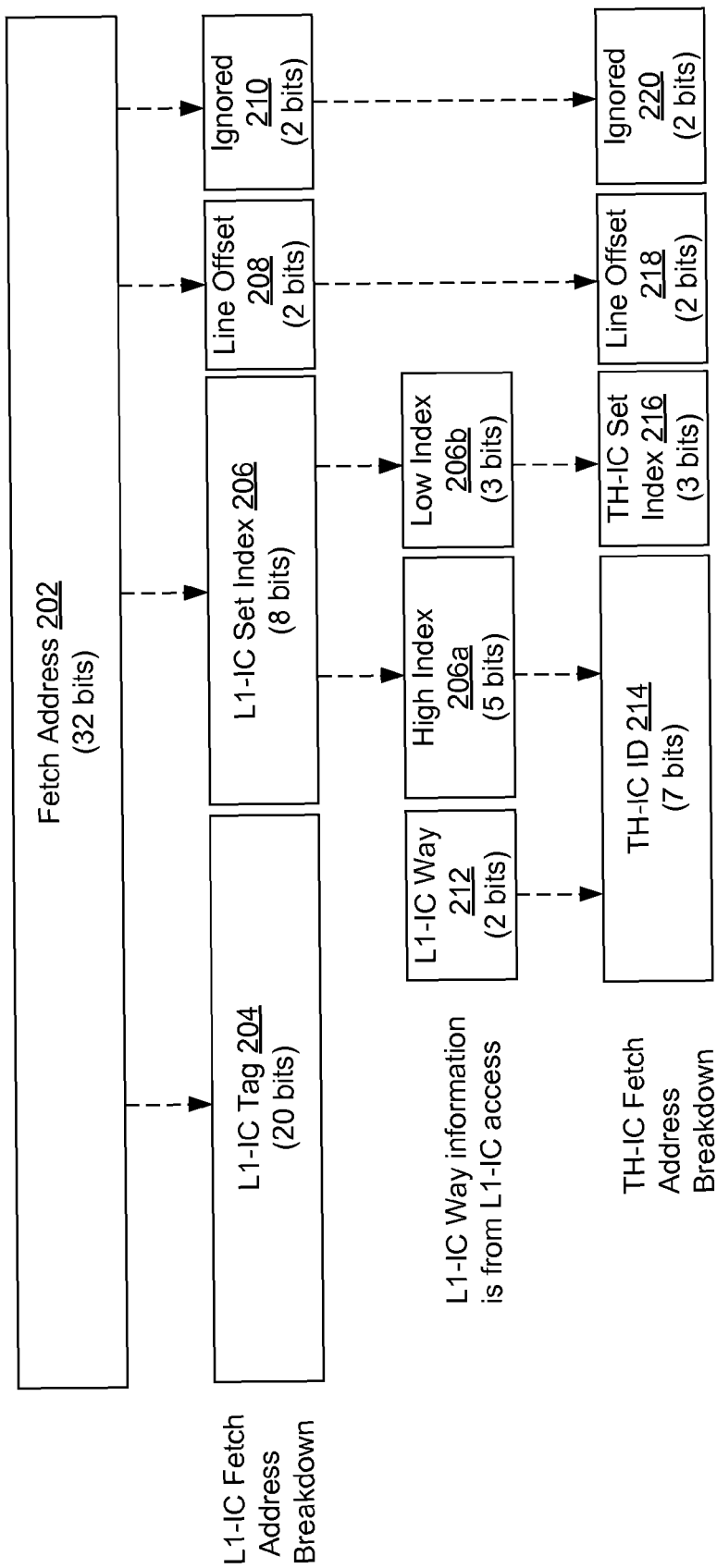
FIG. 2 illustrates an example fetch address breakdown in accordance with an example embodiment of the invention.

FIG. 2 illustrates an example fetch address 202 breakdown in accordance with an example embodiment of the invention. As shown in FIG. 2, an example L1-IC fetch address breakdown may include the following information:

An L1-IC tag 204 (e.g., 20 bits);
An L1-IC set index 206 (e.g., 8 bits), which may be comprised of a high index 206*a* (e.g., 5 bits) and a low index 206*b* (e.g., 3 bits);
A line offset 208 (e.g., 2 bits); and
Ignored (word aligned) bits 210 (e.g., 2 bits).

According to an example embodiment of the invention, an example embodiment of the invention, an example TH-IC fetch address breakdown may include the following information:

A TH-IC ID 214 (e.g., 7 bits), which may be comprised of an L1-IC way 212 (e.g., 2 bits), and the high index 206*a* (e.g., 5 bits), where the L1-IC way 212 may be obtained from the L1-IC access;
A TH-IC set index 216 (e.g., 3 bits), which may include the low index 206*b*;
A Line Offset 218 (e.g., 2 bits), which may include the line offset 208; and
Ignored (word aligned) bits 220 (e.g., 2 bits), which may include the ignored bits 210.

It will be appreciated that a complete tag for the TH-IC fetch address comprising all of the high order bits (e.g., L1-IC tag 204) may be unnecessary since many of the same bits are also checked in parallel during the L1-IC tag check. Accordingly, as described above and shown in FIG. 2, the TH-IC ID 214 field may be comprised of some high-order bits (i.e., high index 206*a*) from the L1-IC set index 206 along with bits (e.g., two bits for the L1-IC way 212) for specifying which line in the L1 instruction cache set is actually associated with this particular address. When the TH-IC 104 is being updated on a potential miss, the L1-IC 102 may already be accessed, so a comparison of whether the appropriate set/way from the L1-IC 102 is already in the TH-IC 104 may be checked in accordance with a miss check.

According to an example embodiment of the invention, the miss check can be done by concatenating or combining the way information (e.g., L1-IC way 212 having 2 bits) for the currently accessed line in the L1-IC 102 and the high-order bits (e.g., 5 bits) of the address corresponding to the set index (e.g., high index 206*a*), and comparing this result to the stored TH-IC ID 214 of the given set, according to an example embodiment of the invention. If these bits match (e.g., 7 bits in this example), then the TH-IC 104 may currently contain the same line from the L1-IC 102 and there may be a false miss such that the TH-IC 104 does not need to be updated with line data from the L1-IC 102, according to an example embodiment of the invention. However, if these bits do not match, or if the L1-IC 102 cache access is also a miss, then there may be a TH-IC 104 true miss, and the line data and the TH-IC 104 may be updated with the appropriate TH-IC ID 214 comprising the way 212 and high index 206*a* information. More specifically, the line data may need to be written into the TH-IC 104 from the L1-IC 102 along with its corresponding TH-IC ID 214. In this way, line data accessed from the L1-IC 102 may also be guaranteed to be available in the TH-IC 104, according to an example embodiment of the invention.

Figure 3:
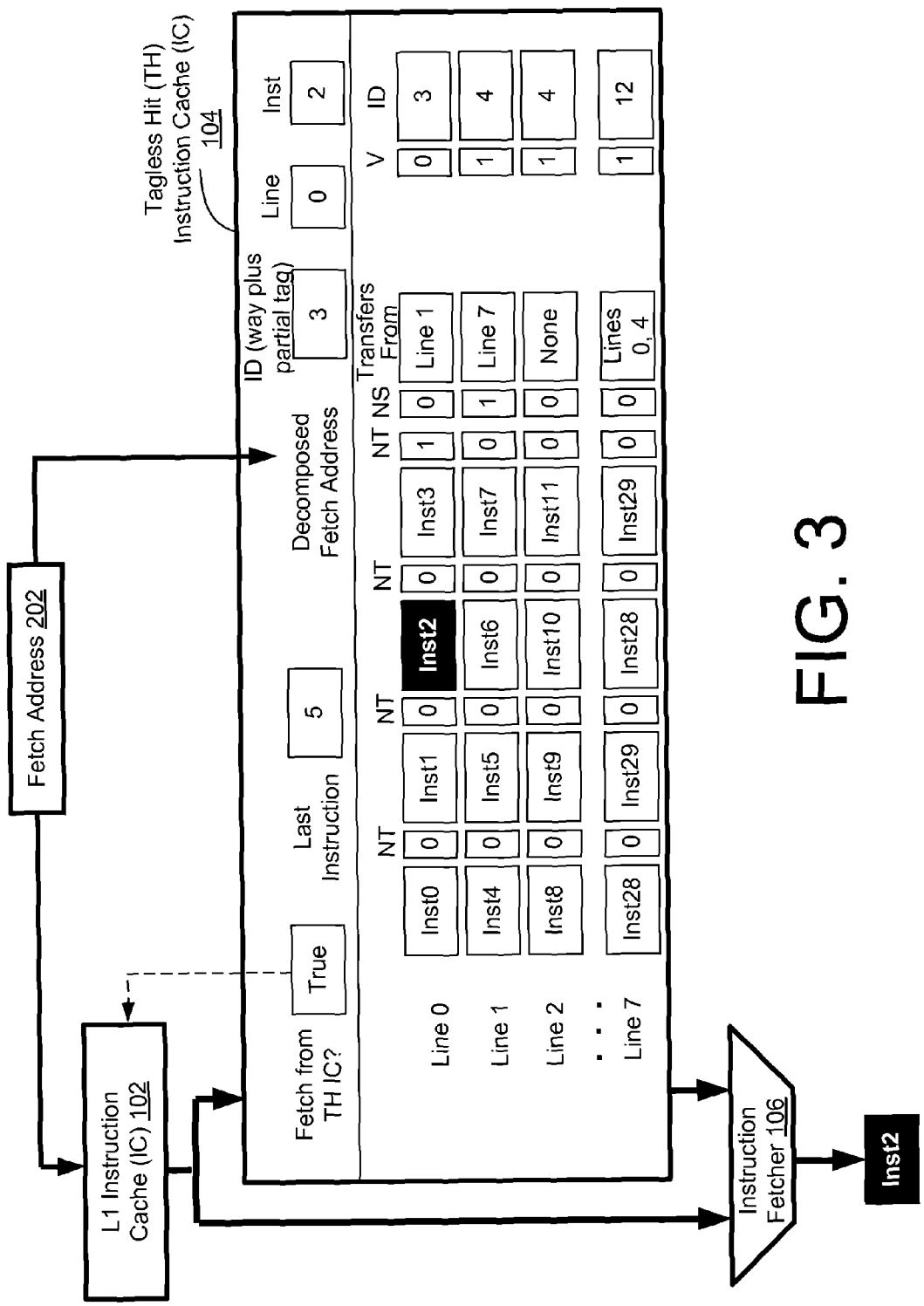
FIG. 3 illustrates an example instruction fetch data path that includes a detailed view of an example tagless hit instruction cache (TH-IC), according to an example embodiment of the invention.

FIG. 3 illustrates an example instruction fetch data path that includes a detailed view of an example TH-IC 104, according to an example embodiment of the invention. An aspect of the TH-IC 104 may be the presence of a decision bit or indicator for determining where to fetch the next instruction from (e.g., Fetch from TH-IC?). This decision bit or indicator may determine when the TH-IC 104 will be bypassed and updated based on the metadata bits (e.g., NT and NS bits described below) contained in the TH-IC line for the current instruction being fetched from the L1-IC 102, as well as the branch prediction status, according to an example embodiment of the invention. In addition, another aspect of the TH-IC 104 may be the tracking of the last instruction accessed from the TH-IC 104, perhaps using a last instruction pointer (e.g., Last Inst). The last line accessed may be extracted from the high-order bits of the last instruction pointer, according to an example embodiment of the invention.

According to an example embodiment of the invention, there may be at least two types of access in the TH-IC 104: (1) a transfer of control (TOC) and (2) sequential access. First, if the predictor specifies a direct transfer of control (e.g., taken branch, call, or jump), then the TH-IC 104 may include metadata in the form of a Next Target (NT) bit or indicator, a respective one of which may be associated with each instruction present in the TH-IC 104, in determining whether a next target instruction is guaranteed to reside in the TH-IC 104. If a current instruction has its NT bit or indicator set, then the transfer target's line may be guaranteed to be available, and thus the next instruction may be fetched from the TH-IC 104. If the NT bit or indicator is not set, then the next instruction may instead be fetched from the L1-IC 102, and the TH-IC 104 may be updated so that the previous instruction's target may now available in the TH-IC 104.

On the other hand, on a sequential fetch access (e.g., branch prediction not taken), if accessing any instruction other than the last one in the line, the next instruction may be fetched from the TH-IC 104 since the next sequential instruction in the line will still be available on the subsequent access. However, if the last instruction in the line is being fetched, then fetching the next instruction from the TH-IC 104 may occur if metadata in the form of the Next Sequential bit (NS) is set. The setting of the NS bit may signify that the next line in the TH-IC 104 actually contains the next sequential line in memory, according to an example embodiment of the invention.

Accordingly, a current cycle's branch prediction may be utilized to determine whether the next fetch is sequential or not, according to an example embodiment of the invention. If a taken branch is predicted, then corresponding metadata such as an NT bit for the current instruction fetch may be utilized to determine whether to fetch from the TH-IC 104 or the L1-IC 102. On the other hand, for a sequential access, the metadata such as an NS bit of the current instruction fetch may be utilized if the instruction is at the end of the data line. Otherwise, the next instruction will be fetched from the TH-IC 104 since the entire data line previously retrieved from the L1-IC 102 has been stored in the TH-IC 104.

It will be appreciated that there may be variations of the metadata stored with the instructions in the TH-IC 104. According to an example embodiment of the invention, the metadata stored with the instructions in the TH-IC 104 may be utilized for further power conservation. Indeed, the metadata in the TH-IC 104 may be utilized to limit access to non-essential components such as one or more of a branch predictor (BP), a branch target buffer (BTB), and a return address stack (RAS), according to an example embodiment of the invention. For example, during a sequential access—that is, when the next fetched instruction can be guaranteed to reside in the TH-IC 104—speculation components may be temporarily disabled to conserve power.

According to another example embodiment of the invention, a single Next Sequential Non-Branch bit (NSNB) may also be added as metadata to each instruction in the lines stored in the TH-IC 104. On sequential transitions both within and across lines, this NSNB bit may be set when the next fetched instruction is not a transfer of control instruction, according to an example embodiment of the invention. Whenever the NSNB bit is set and the fetch is sequential, the BP, BTB, or RAS may not need to be activated on the following cycle, according to an example embodiment of the invention.

Figure 4A:
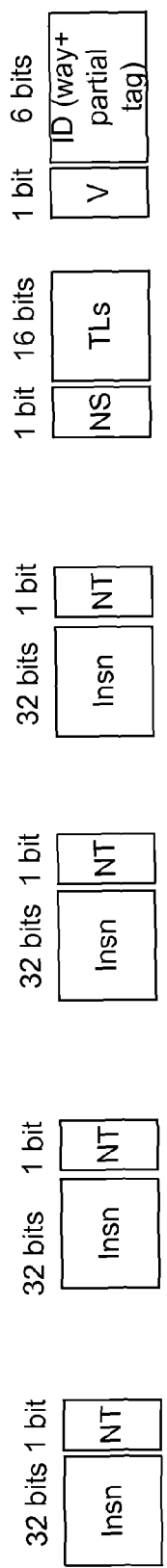
FIGS. 4A-4C illustrate example of metadata configurations for an example TH-IC, according to an example embodiment of the invention.
Figure 4B:
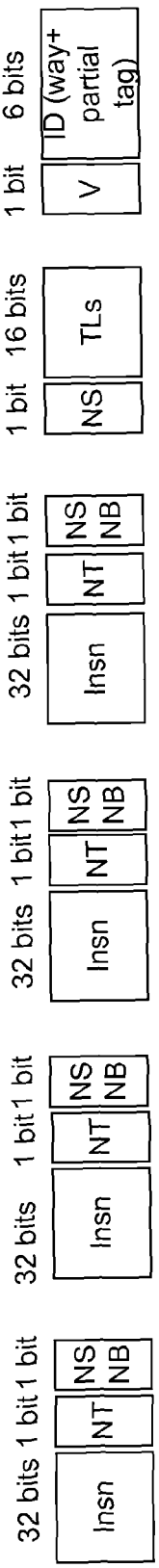
Figure 4C:
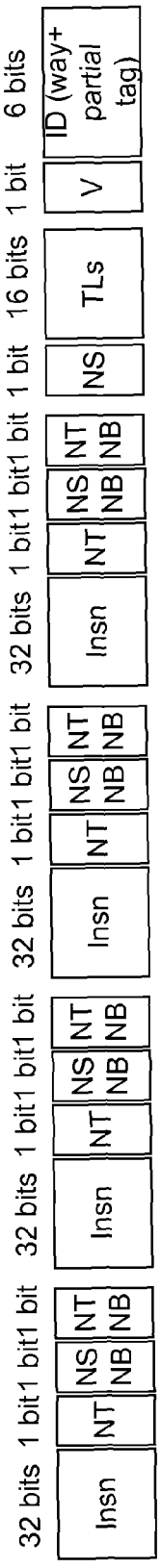

FIGS. 4A-4C illustrate example of metadata configurations for an example TH-IC, according to an example embodiment of the invention. FIG. 4A illustrates an example baseline metadata configuration, as similarly described with respect to the FIG. 3. FIG. 4B illustrates that additional metadata such as a single Next Sequential Non-Branch bit (NSNB) may be added to each instruction in the line of the TH-IC 104. On sequential transitions both within and across lines, the NSNB bit may be set when the next fetched instruction is not a transfer of control instruction. Whenever this bit is set and the fetch is sequential, the BP, BTB, and RAS may not need to be activated on the following cycle. This will not yield any increases in execution time, as the NSNB bit can only be set when the next instruction is not a transfer of control.

It will also be appreciated that the utilization of the NSNB bit may be extended to accept transfer of control instructions that are strongly not-taken (e.g., approximately 23.73% of branches). This usage may be referred to as NSOO due to 00 being the strongly not-taken bimodal BP state. In this configuration, whenever a branch is encountered and a prediction is made that it is strongly not-taken (state 00), the previous (sequential) instruction can set its NSNB bit. When this instruction is later fetched, the NSNB bit may indicate that no prediction should be made, according to an example embodiment of the invention. This is a change in the branch predictor that now makes the strongly not-taken state a non-transitioning state as long as the instruction remains in the TH-IC 104. It will be appreciated that this may increase execution time, since although mispredictions will update the actual BP/BTB state, the NSNB bit will remain set until this line's metadata is invalidated due to eviction of a target line or itself. The metadata may not be updated since the corresponding TH-IC 104 entry location may not be available in any later pipeline register (due to area/energy concerns), according to an example embodiment of the invention.

FIG. 4C illustrates an example variation of FIG. 4B that that adds additional metadata such as a single Next Target Non-Branch bit (NTNB) for each instruction in the line, according to an example embodiment of the invention. This NTNB bit may serve a similar role as the NSNB bit, but it is set for branch instructions whenever the corresponding target instruction is not a transfer of control or is strongly not-taken. Most branches do not jump to unconditional jumps since compiler optimizations such as branch chaining can replace such a chain with a single branch. Conditional branch instructions are also rarely targets, since transfers of control are typically preceded by comparison instructions. Calls are rarely targets since they usually require additional instructions to produce arguments. Finally, returns are rarely targets since registers are often restored before the return. Thus, NTNB bits are generally quickly set for each transfer of control. It will be appreciated that this speculatively reduces the need to access the BP, BTB, and RAS structures.

It will also be appreciated that adding more metadata bits to the TH-IC 104 may necessitate additional steps to take for line invalidation in the TH-IC 104, according to an example embodiment of the invention. When a line is evicted, all NSNB and NTNB bits may be cleared, as well as the previous line's last NSNB bit (e.g., like its NS bit). Whenever an NT bit is cleared, the corresponding NTNB bit may also be cleared, according to an example embodiment of the invention.

Figure 5A:
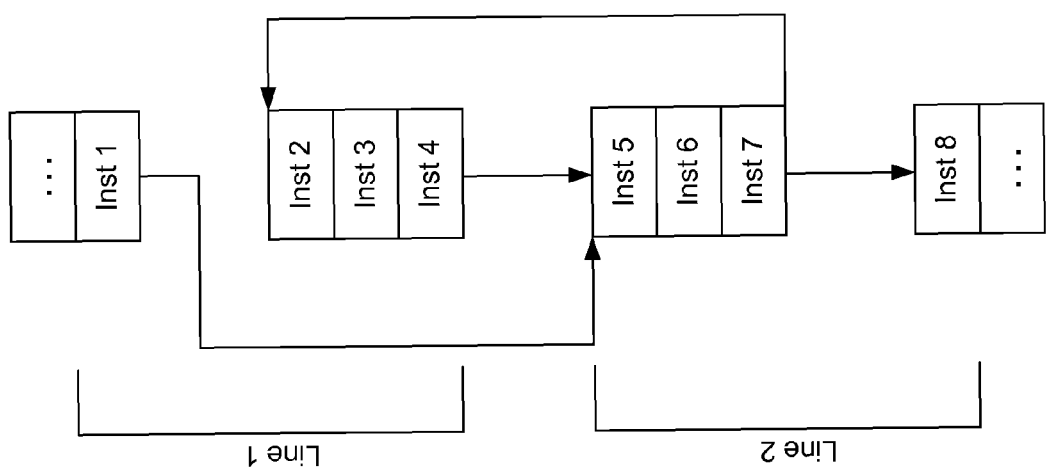
FIG. 5A shows an example that illustrates how instructions may be guaranteed to reside in an example TH-IC, according to an example embodiment of the invention.

FIG. 5A shows an example that illustrates how instructions may be guaranteed to reside in the TH-IC 104, according to an example embodiment of the invention. As shown in FIG. 4, there may be eight instructions (i.e., Inst 1-Inst 8) spanning four basic blocks and two lines (i.e., Line 1 & Line 2) within the TH-IC 104. In FIG. 4, instruction 1 is fetched and is a miss. The previous line's NS bit within the TH-IC 104 may be set since there was a sequential transition from line 0 to line 1. Instruction 5 is fetched after the transfer of control and it is also a miss. Instruction 1's NT bit may be set to reflect that the target of instruction 1 resides in the TH-IC 104. Instructions 6 and 7 are fetched and may be guaranteed to be hits since they may be sequential references within the same line. Instruction 2 is fetched and it resides in the TH-IC 104, but it is a false miss since it was not guaranteed to hit in the TH-IC 104 (instruction 7's NT bit is initially false). At this point, the NT bit for instruction 7 may be set to indicate that its target now in the TH-IC 104. Instructions 3 and 4 are fetched and are hits due to the intra-line access. Instruction 5 is fetched and is a false miss (i.e., line 1's NS bit is false). Line 1's NS bit may be set at this point indicating that the next sequential line now resides in the TH-IC 104. The instructions fetched in the remaining iterations of the loop may be guaranteed to be hits since the TH-IC 104 metadata indicates that the transitions between lines (e.g., line 1's NS bit and instruction 7's NT bit) will be hits. Finally, instruction 8 is fetched and will be a hit since it is a sequential reference within the same line.

Figure 5B:
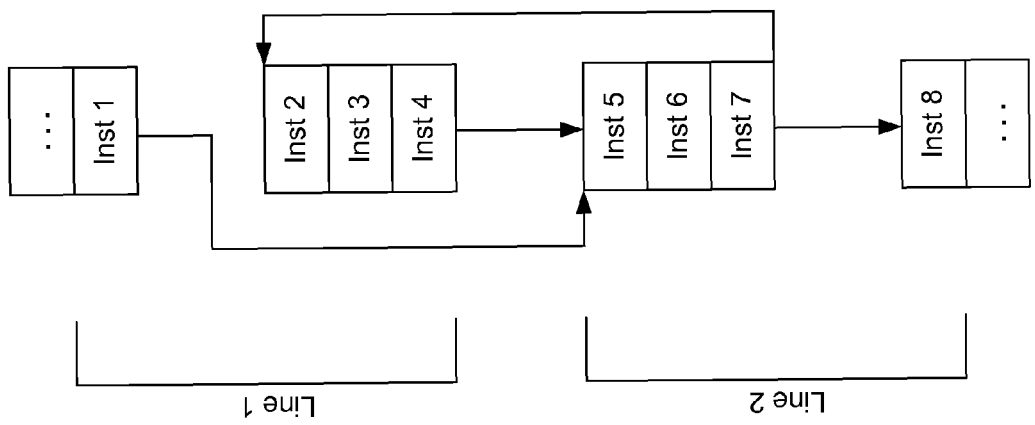
FIG. 5B shows an alternate example that illustrates how instructions may be guaranteed to reside in an example TH-IC, according to an example embodiment of the invention.

FIG. 5B shows an alternate example that illustrates how instructions may be guaranteed to reside in an example TH-IC 104, according to an example embodiment of the invention. In particular, FIG. 5B extends the example of FIG. 5A to now include additional metadata in the form of the NSNB and NTNB bits, as discussed previously. Likewise, as shown in FIG. 5B, there may be tracking of the number of BTB/BP/RAS accesses required in addition to the L1-IC 102 and ITLB (Instruction Translation Lookaside Buffer) accesses. The NSNB and NTNB bits are set as the fetch engine gathers information about the instructions fetched in this loop. As shown in FIG. 5B, during the subsequent loop executions, the BTB/BP/RAS may need to be accessed only when fetching, for example, instruction 7, thereby leading to only one single speculation access per iteration. Without NTNB bits, the fetch of instruction 2 would also require a BTB/BP/RAS access, since the branch transition from instruction 7 would not be guaranteed to not target another branch.

It will also be appreciated that in addition to dealing with strongly not-taken branches, the fetch engine may also handle strongly taken conditional branches (e.g., encoded as 11 in the bimodal BP) since they will frequently occur due to loops. For instance, the BTB/BP/RAS structures may be accessed each time instruction 7 in FIG. 5B is fetched. The fetch engine could enable just the BTB and RAS, while always automatically predicting such branches are taken, according to an example embodiment of the invention.

Figure 6:
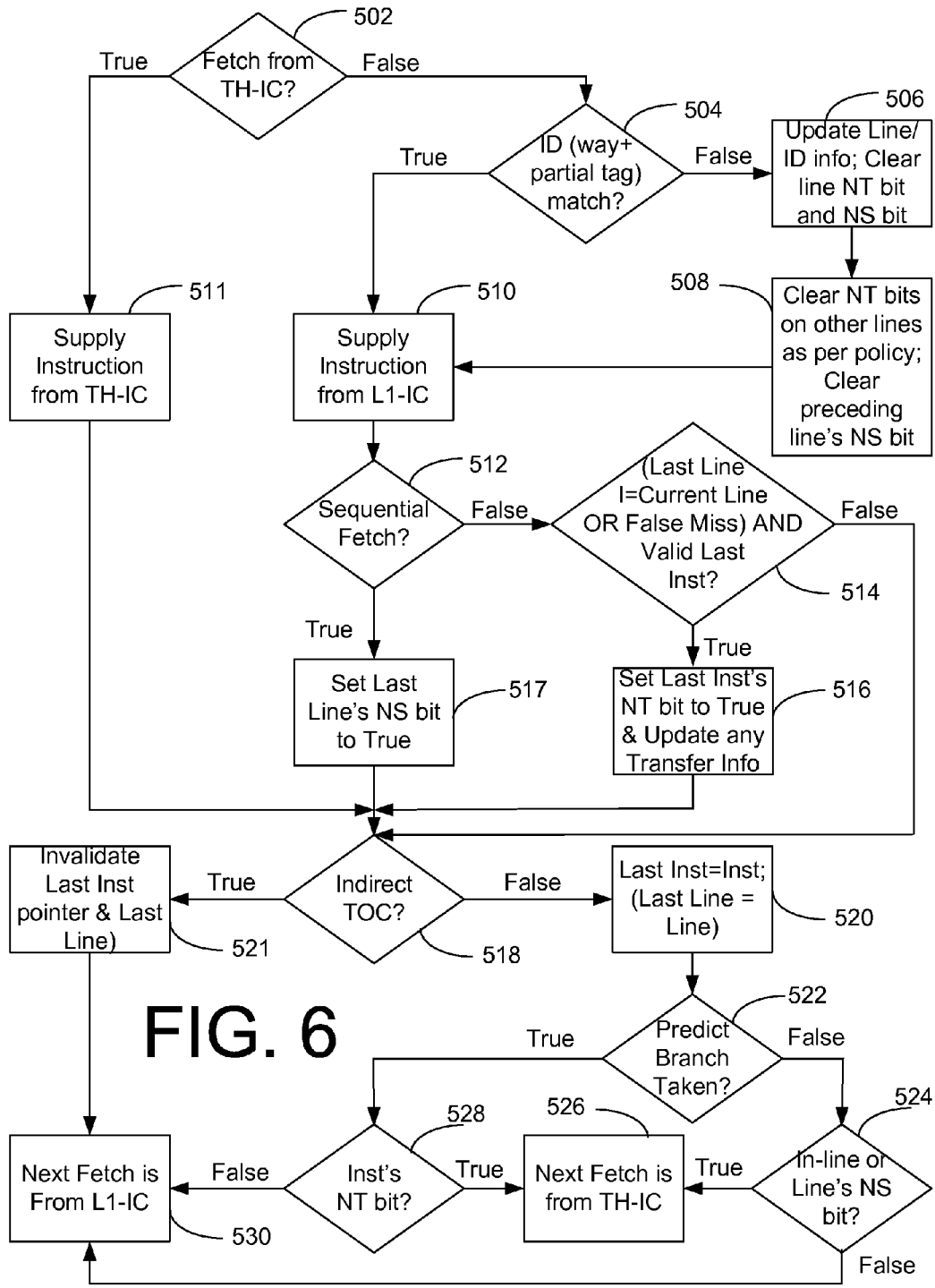
FIG. 6 shows an example a flow diagram that illustrates an operation of an example TH-IC, according to an example embodiment of the invention.

FIG. 6 shows an example flow diagram that illustrates an operation of a TH-IC 104, according to an example embodiment of the invention. In general, the operation of the TH-IC 104 may involve either a fetch or an update. In FIG. 6, a first step, as illustrated in block 502 (e.g., Fetch from TH-IC?), may be a decision based on whether to fetch from the L1-IC 102 or the TH-IC 104. A fetch may be similar to traditional instruction fetch on a cache hit. An update may replace the concept of the traditional cache miss.

If block 502 determines that a fetch should be performed from the TH-IC 104 (i.e., Fetch from TH-IC=True), then processing may proceed to block 511, wherein the instruction may be supplied from the TH-IC 104. On the other hand, block 502 may determine that an update may need to be performed by the TH-IC 104 if the fetch cannot be performed from the TH-IC 104. Accordingly, the TH-IC 104 may perform an update whenever the instruction/line being fetched is not guaranteed to be in TH-IC 104. It will be appreciated that the non-guarantee of the instruction/line being in the TH-IC 104 does not necessarily mean that the instruction/line is not present in the cache as there is a possibility of a false miss.

If block 502 determines that the instruction/line being fetched is not guaranteed to be in TH-IC 104 (i.e., Fetch from TH-IC=False), then processing may proceed to block 504. Availability of the instruction/line may be checked in block 504 by performing a tag/ID comparison within the TH-IC 104 in parallel with the L1-IC 102 fetch. On a false miss where block 504 is true, the TH-IC 104 may not need to write the cache line from the L1-IC 102, and may additionally not need to invalidate any additional cache metadata.

If the fetch is a true miss (block 504 is false), however, then the appropriate line in the TH-IC 104 may need to be replaced and various portions of the TH-IC 104 may need to be updated/invalidated. First, on a true miss, the new line needs to be written into cache from the L1-IC 102 along with its corresponding TH-IC ID 214. The metadata, including the NS bit and the NT bits, for each instruction in this line may be cleared (block 506), as there is no guarantee that any branch target or the next sequential line is available in TH-IC 104. If a line is being replaced that has a known branch target, then the NT bits on all corresponding lines that may have transfers of control to this line may likewise be invalidated or cleared (block 508). According to an example embodiment of the invention, the manipulation of metadata for multiple lines (e.g., block 508) may not be particularly onerous since the total number of metadata bits may be extremely small. It will be appreciated that block 508 may involve one or more possible schemes for keeping track of where transfers originate, according to an example embodiment of the invention.

Processing in block 510 may involve supplying the instruction/line from the L1-IC 102, and processing may then proceed to block 512 Block 512 may include using the previous branch prediction's direction bit to determine whether the current fetch is a sequential fetch or a transfer of control. If the access is sequential (i.e., Sequential Fetch=True) in block 512, then the previous line's NS bit may be set (block 517) since the TH-IC 104 is simply being filled with the next sequential line in memory. It will be appreciated that a sequential fetch may cause a cache miss when the first instruction in a new line is being fetched, according to an example embodiment of the invention. For transfers of control (e.g., Sequential Fetch=False in block 512), the last instruction fetched may need to be tracked. If the line containing the transfer of control is not being replaced (block 514 being true), the last instruction's NT bit may be set to signify that its branch target is now available in the TH-IC 104 (block 516).

Once the instruction is fetched, the last instruction pointer (and hence last line pointer) may need to be updated, and a determination may need to be made as to whether the next fetch will come from the TH-IC 104 or the L1-IC 102. To do so, in block 518, a determination may need to be made as to whether the current instruction is an indirect transfer of control (TOC). If an indirect transfer of control is detected (block 518 is true), then the next fetch may need to be directed to the L1-IC 102 (block 530), since there is no guarantee that an indirect branch target will remain unchanged. Likewise, the last instruction pointer may be invalidated (block 521) so that the next instruction will not incorrectly set the indirect transfer's NT bit. The result of the current cycle's branch prediction may be relied upon to determine whether the next fetch is sequential or not, according to an example embodiment of the invention.

If a direct transfer is detected (block 518 is false), then processing may proceed to block 520, where the last instruction may be set to the current instruction (or the last line set to the current line). Likewise, direct transfers of control may not change their targets, and thus, the NT bit may be sufficient for guaranteeing that a target is available in TH-IC 104. In block 522, if a taken direct branch is predicted (block 522 being true), then processing may proceed to block 528, where the corresponding NT bit for the current instruction fetch may be used to decide whether to fetch from the TH-IC 104 (block 526) or the L1-IC 102 (block 530). If instead it is a sequential access (block 522 is false), then processing may proceed to block 524, and the NS bit of the current fetch line is used to determine whether the end of the line has been reached. If at the end of the line (block 524 is false), then the next fetch may be from the L1-IC 102. If elsewhere in the line (block 524 is true), then the next instruction will be fetched from the TH-IC 104 (block 526) based on the line buffer principle that guarantees that the next instruction is in the TH-IC 104. It will be appreciated that when there is a pipeline flush due to a branch misprediction, the fetch is from the L1-IC 102 on the next cycle since there is no guarantee that the TH-IC 104 contains the potentially new address, according to an example embodiment of the invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system, comprising:
    an L1 instruction cache, wherein the L1 instruction cache includes a plurality of lines of data, wherein each line of data includes one or more instructions; and
    a tagless hit instruction cache, wherein the tagless hit instruction cache stores a subset of the lines of data in the L1 instruction cache, wherein each line of data stored in the tagless hit instruction cache is stored with respective dynamically adjustable metadata indicative of whether a next instruction is guaranteed to reside in the tagless hit instruction cache, the metadata comprising first metadata indicative of whether a target instruction for a transfer of control instruction is guaranteed to reside in the tagless hit instruction cache and second metadata indicative of whether a next sequential line of data is guaranteed to reside in the tagless hit instruction cache,
    wherein an instruction fetcher is arranged to have direct access to the L1 instruction cache and the tagless hit instruction cache, and wherein the tagless hit instruction cache is arranged to have direct access to the L1 instruction cache, and
    wherein upon each actual miss that occurs when an instruction is fetched by the instruction fetcher from the L1 instruction cache but not already stored in the tagless hit instruction cache, a current line of data associated with the fetched instruction is stored in the tagless hit instruction cache.

2. The system of claim 1, wherein the one or more instructions include at least one of sequential instructions or transfer of control instructions.

3. The system of claim 1, wherein the plurality of lines of data includes a first line of data, wherein the first line of data includes a plurality of sequential instructions, including a last sequential instruction that is positioned at an end of the plurality of sequential instructions, and
    wherein the second metadata associated with the first line of data is associated with the last sequential instruction.

4. The system of claim 1, wherein the first metadata includes data that specifies, for a backward branch transfer of control instruction, whether a target instruction is stored in the tagless hit instruction cache.

5. The system of claim 1, wherein a next instruction is not guaranteed to reside in the tagless hit instruction cache based upon the stored metadata, wherein the next instruction is accessed by the instruction fetcher from the L1 instruction cache.

6. The system of claim 1, wherein one or more instructions in the lines of data stored in the tagless hit instruction cache are stored with third metadata for limiting access to one or more of a branch predictor (BP), a branch target buffer (BTB), or a return address stack (RAS).

7. The system of claim 1, wherein each line of data in the L1 instruction cache is stored in association with a first fetch address tag, and wherein each associated line of data stored in the tagless hit instruction cache is stored in association with a second fetch address tag comprising only a portion of information from the first fetch address tag.

8. The system of claim 7, wherein the second fetch address tag is obtained from truncating the first fetch address tag.

9. The system of claim 1, wherein a branch prediction result indicates that a target of a transfer of control instruction will not be taken, and
    wherein, based upon the branch prediction result, a determination is made as to whether a next sequential instruction is included in the tagless hit instruction cache.

10. A method for instruction fetching for a computer processor, comprising:
    providing an L1 instruction cache, wherein the L1 instruction cache includes a plurality of lines of data, wherein each line of data includes one or more instructions;
    providing a tagless hit instruction cache, wherein the tagless hit instruction cache stores a subset of the lines of data in the L1 instruction cache, wherein each line of data stored in the tagless hit instruction cache is stored with respective dynamically adjustable metadata indicative of whether a next instruction is guaranteed to reside in the tagless hit instruction cache, the metadata comprising first metadata indicative of whether a target instruction for a transfer of control instruction is guaranteed to reside in the tagless hit instruction cache and second metadata indicative of whether a next sequential line of data is guaranteed to reside in the tagless hit instruction cache;
    configuring an instruction fetcher to have direct access to the L1 instruction cache and the tagless hit instruction cache; and
    configuring the tagless hit instruction cache to have direct access to the L1 instruction cache,
    wherein upon each actual miss that occurs when an instruction is fetched by the instruction fetcher from the L1 instruction cache but not already stored in the tagless hit instruction cache, a current line of data associated with the fetched instruction is stored in the tagless hit instruction cache.

11. The method of claim 10, wherein the one or more instructions include at least one of sequential instructions or transfer of control instructions.

12. The method of claim 10, wherein the plurality of lines of data includes a first line of data, wherein the first line of data includes a plurality of sequential instructions, including a last sequential instruction that is positioned at an end of the plurality of sequential instructions, and
    wherein the second metadata associated with the first line of data is associated with the last sequential instruction.

13. The method of claim 10, wherein the first metadata includes data that specifies, for a backward branch transfer of control instruction, whether a target instruction is stored in the tagless hit instruction cache.

14. The method of claim 10, wherein a next instruction is not guaranteed to reside in the tagless hit instruction cache based upon the stored metadata, wherein the next instruction is accessed by the instruction fetcher from the L1 instruction cache.

15. The method of claim 10, wherein one or more instructions in the lines of data stored in the tagless hit instruction cache are stored with third metadata for limiting access to one or more of a branch predictor (BP), a branch target buffer (BTB), or a return address stack (RAS).

16. The method of claim 10, wherein each line of data in the L1 instruction cache is stored in association with a first fetch address tag, and wherein each associated line of data stored in the tagless hit instruction cache is stored in association with a second fetch address tag comprising only a portion of information from the first fetch address tag.

17. The method of claim 16, wherein the second fetch address tag is obtained from truncating the first fetch address tag.

18. The method of claim 10, wherein a branch prediction result indicates that a target of a transfer of control instruction will not be taken, and
wherein, based upon the branch prediction result, a determination is made as to whether a next sequential instruction is included in the tagless hit instruction cache.

* * * * *